United States Patent
Jeon et al.

(10) Patent No.: US 9,145,968 B2
(45) Date of Patent: Sep. 29, 2015

(54) DEVICE AND METHOD FOR CONTROLLING SHIFT IN VEHICLE

(71) Applicant: Hyundai Motor Company, Seoul (KR)

(72) Inventors: Byeong Wook Jeon, Seoul (KR); Joseph D. Chang, Yongin-si (KR); Dong Hoon Jeong, Osan-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/141,353

(22) Filed: Dec. 26, 2013

(65) Prior Publication Data

US 2014/0365087 A1 Dec. 11, 2014

(30) Foreign Application Priority Data

Jun. 7, 2013 (KR) .................. 10-2013-0065507

(51) Int. Cl.
*F16H 59/48* (2006.01)
*F16H 61/02* (2006.01)
*F16H 61/00* (2006.01)

(52) U.S. Cl.
CPC ............ *F16H 61/0204* (2013.01); *F16H 59/48* (2013.01); *F16H 2061/0081* (2013.01); *Y10T 477/692* (2015.01)

(58) Field of Classification Search
CPC .................. F16H 2061/0081; F16H 2061/009; F16H 2061/0096; F16H 61/0009; F16H 59/48; Y10T 477/692

USPC ........ 701/55, 56, 57, 58, 59, 60, 65; 477/120, 477/904

See application file for complete search history.

(56) References Cited

U.S. PATENT DOCUMENTS

| 4,829,434 | A * | 5/1989 | Karmel et al. .................. 701/59 |
| 8,903,614 | B1 * | 12/2014 | Jeon et al. ...................... 701/57 |
| 2001/0003807 | A1 * | 6/2001 | Lee ................................. 701/51 |
| 2002/0026841 | A1 * | 3/2002 | Svendsen ....................... 74/335 |
| 2004/0014564 | A1 * | 1/2004 | Jager et al. .................... 477/115 |
| 2005/0114003 | A1 * | 5/2005 | Baize ............................. 701/65 |
| 2008/0097674 | A1 * | 4/2008 | Kuwahara et al. ............. 701/51 |
| 2008/0167820 | A1 * | 7/2008 | Oguchi et al. ................ 701/301 |
| 2011/0172864 | A1 * | 7/2011 | Syed et al. ..................... 701/22 |
| 2014/0277972 | A1 * | 9/2014 | Jeon et al. ...................... 701/51 |
| 2014/0297140 | A1 * | 10/2014 | Jeon et al. ...................... 701/55 |

FOREIGN PATENT DOCUMENTS

| JP | 5-203039 A | 8/1993 |
| JP | 2010-71299 A | 4/2010 |
| JP | 2012-127448 A | 7/2012 |
| KR | 1020090050235 A | 5/2009 |

* cited by examiner

*Primary Examiner* — Roger Pang
(74) *Attorney, Agent, or Firm* — Morgan, Lewis & Bockius LLP

(57) ABSTRACT

A device for controlling shift in a vehicle may include a data detector configured to detect data for a shift control and a controller configured to determine a short-term driving tendency of a driver using the data, determine a long-term driving tendency of the driver using the short-term driving tendency of the driver, and control shift in the vehicle in consideration of a running mode of the vehicle and the long-term driving tendency which are determined from the data.

8 Claims, 5 Drawing Sheets

DEVICE AND METHOD FOR CONTROLLING SHIFT IN VEHICLE

CROSS-REFERENCE TO RELATED APPLICATION

The present application claims priority of Korean Patent Application Number 10-2013-0065507 filed on Jun. 7, 2013, the entire contents of which application are incorporated herein for all purposes by this reference.

BACKGROUND OF INVENTION

1. Field of Invention

The present invention relates to a device and a method for controlling shift in a vehicle, and more particularly, to a device and a method for controlling shift in a vehicle which may more accurately reflect a driver's intention when shift is performed by controlling the shift in consideration of a running mode and a long-term driving tendency of a driver.

2. Description of Related Art

Rating satisfaction of running performance in respect to a customer is dependent on how a vehicle runs and coincides with a driving tendency of the customer. While tendencies of the customers vary, however, performance characteristic of the vehicle is set to one performance characteristic in the same vehicle model. Therefore, reaction of the vehicle may not coincide with the tendency of the customer. Accordingly, the customer frequently makes a complaint about the running performance of the vehicle. That is, when the driving tendency of the customer is recognized, and a shift is controlled so that the vehicle responds suitably to the driving tendency of the customer, the satisfaction of the customer regarding running performance may be maximized.

Accordingly, many methods of learning the driving tendency of the customer over a long period of time and controlling the shift in accordance with the learned driving tendency has been developed. In a device for controlling shift in the vehicle, a function of controlling a shift pattern of the vehicle so as to be different in accordance with the driving tendency is typically operated only in a normal running mode, and in a case in which a running mode is changed to a sporty mode, the device for controlling shift in a vehicle controls the shift in the vehicle only by the shift pattern of the existing sporty mode.

However, because when the running mode is the sporty mode, the shift is controlled in the vehicle in the shift pattern of the sporty mode that is regardless of the tendency of the driver, the shift cannot be controlled in accordance with the learned driving tendency. Accordingly, the actual driving will of the driver may not be reflected on the shift and the driver may dissatisfy with the driving performance.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a device and a method for controlling shift in a vehicle which may more accurately reflect a driver's intention when shift is performed by considering a current running mode of a vehicle and a long-term driving tendency of a driver over a comparatively long time (e.g., from purchase of the vehicle to the present).

Various aspects of the present invention provide a device for controlling shift in a vehicle including: a data detector configured to detect data for shift control; and a controller configured to determine a short-term driving tendency of a driver using the data, determine a long-term driving tendency of the driver using the short-term driving tendency of the driver, and control shift in the vehicle in consideration of a running mode of the vehicle and the long-term driving tendency which are determined from the data.

The controller may calculate a short-term driving tendency index using the data, and determine the short-term driving tendency that is divided in a plurality of sections in accordance with a value of the short-term driving tendency index. Further, the controller may calculate a long-term driving tendency index using the short-term driving tendency, and determine the long-term driving tendency that is divided in a plurality of sections in accordance with a value of the long-term driving tendency index. In addition, the controller may determine whether the running mode is a first mode.

Here, when it is determined that the running mode is the first mode, the controller may determine whether the long-term driving tendency index of the driver is equal to or greater than a predetermined reference value. Further, when it is determined that the long-term driving tendency index of the driver is equal to or greater than the predetermined reference value, the controller may change the running mode to a second mode. Alternatively, when it is determined that the long-term driving tendency index of the driver is less than the predetermined reference value, the controller may maintain the running mode as the first mode.

Meanwhile, the data may include at least one of a speed of the vehicle, acceleration of the vehicle, a shift-speed, a steering angle of the vehicle, and a distance between the driver's vehicle and a forward vehicle.

Various other aspects of the present invention provide a method for controlling shift in a vehicle including: detecting data for shift control; determining a short-term driving tendency of a driver using the data; determining a long-term driving tendency of the driver using the short-term driving tendency of the driver; determining a running mode of the vehicle from the data; and controlling shift in the vehicle in consideration of the long-term driving tendency and the running mode of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
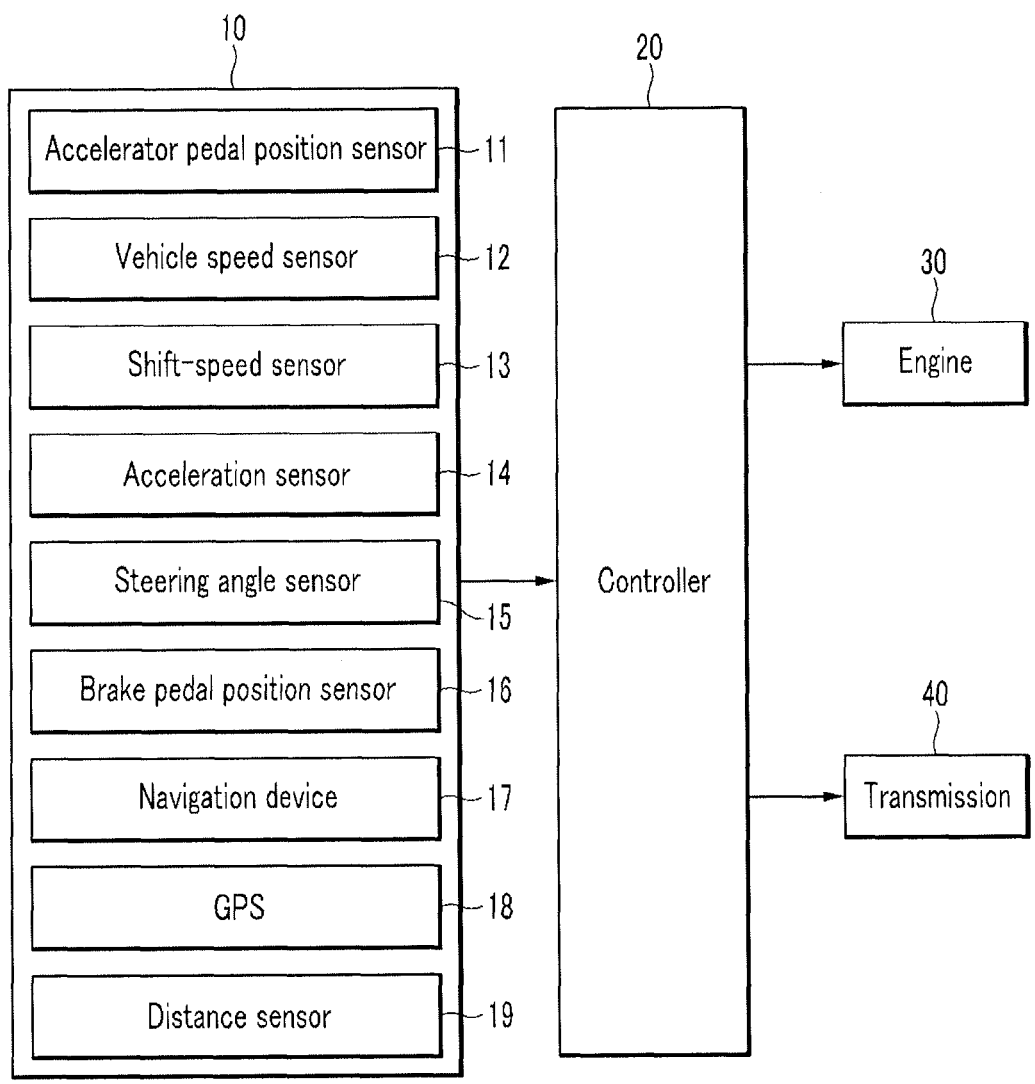
FIG. 1 is a block diagram of an exemplary device for controlling shift in a vehicle according to the present invention.

FIG. 1 is a block diagram of a device for controlling shift in a vehicle according to various embodiments of the present invention. As illustrated in FIG. 1, a device for controlling shift in a vehicle may include a data detector 10, and a controller 20.

The data detector 10 detects data for shift control, and the data measured by the data detector 10 is transmitted to the controller 20. The data detector 10 includes an accelerator pedal position sensor 11, a vehicle speed sensor 12, a shift-speed sensor 13, an acceleration sensor 14, a steering angle sensor 15, a brake pedal position sensor 16, a navigation device 17, a global positioning system (GPS) 18, and a distance sensor 19.

The accelerator pedal position sensor 11 measures how much a driver presses an accelerator pedal. That is, the accelerator pedal position sensor 11 measures data regarding a driver's intention of accelerating a vehicle. The vehicle speed sensor 12 measures a speed of the vehicle, and is mounted to a wheel of the vehicle. In some cases, a vehicle speed may be calculated on the basis of a GPS signal received by the GPS 18.

Meanwhile, a target shift-speed may be calculated on the basis of a signal of the accelerator pedal position sensor 11 and a signal of the vehicle speed sensor 12 using a shift pattern, and the shift to the target shift-speed is controlled. That is, in the case of an automatic transmission including a plurality of planetary gear sets and a plurality of friction elements, hydraulic pressure, which is supplied to the plurality of friction elements or released from the plurality of friction elements, is adjusted. In addition, in the case of a double clutch transmission, a current, which is applied to a plurality of synchronizer devices and actuators, is controlled.

The shift-speed sensor 13 detects a shift-speed that is currently engaged. The acceleration sensor 14 detects acceleration of the vehicle. In addition to the vehicle speed sensor 12, the acceleration sensor 14 is mounted to directly detect acceleration of the vehicle, or acceleration of the vehicle may be calculated by differentiating the vehicle speed detected by the vehicle speed sensor 12.

The steering angle sensor 15 detects a steering angle of the vehicle. That is, the steering angle sensor 15 detects a direction in which the vehicle intends to run. The brake pedal position sensor 16 detects whether the brake pedal is pressed or not. That is, the brake pedal position sensor 16 detects the driver's intention of accelerating the vehicle together with the accelerator pedal position sensor 11.

The navigation device 17 is a device that informs the driver of a path to a destination. The navigation device 17 includes an input and output unit configured to input and output information on a route guide, a current position detector configured to detect information on a current position of the vehicle, a memory storing map data, which is necessary to calculate a route, and data, which is necessary to guide the driver, a control unit configured to perform a route search or a route guide, and the like.

The GPS 18 receives a signal transmitted from a GPS satellite, and transmits a signal corresponding there to the navigation device 17. The distance sensor 19 detects a distance between the driver's vehicle and a forward vehicle. As the distance sensor 19, various sensors such as an ultrasonic wave sensor or an infrared sensor may be used.

The controller 20 may determine a short-term driving tendency and a long-term driving tendency of the driver on the basis of the data detected by the data detector 10. To this end, the controller 20 may be implemented with at least one processor that is operated by a predetermined program, and the predetermined program may be programmed in order to perform each step of a method for controlling shift in a vehicle according to an exemplary embodiment of the present invention.

The controller 20 may include a short-term driving tendency index calculator, a memory, and a long-term driving tendency index calculator. The short-term driving tendency index calculator determines the short-term driving tendency of the driver for a comparatively short time on the basis of the data detected by the data detector 10. That is, the short-term driving tendency index calculator may determine a driving tendency of the driver, for example, while the vehicle currently runs or during a predetermined time while the vehicle currently runs.

Here, the data used to determine the short-term driving tendency may include information on at least one of a speed of the driver's vehicle, acceleration of the driver's vehicle, a shift-speed that is currently engaged, a shift pattern, a steering angle of the vehicle, a tendency of changing a steering angle of the vehicle, and a distance between the driver's vehicle and the forward vehicle.

The short-term driving tendency of the driver may be determined on the basis of how well one or a plurality of assumptions regarding a tendency of the driver is satisfied, and a fuzzy control theory may be used to determine the short-term driving tendency of the driver. The short-term driving tendency of the driver determined by the short-term driving tendency index calculator is calculated as a short-term driving tendency index, and the short-term driving tendency index is transmitted to and stored in the memory. The memory stores the short-term driving tendency index calculated by the short-term driving tendency index calculator.

The long-term driving tendency index calculator determines a long-term driving tendency of the driver from a plurality of short-term driving tendency indexes stored in the memory. The long-term driving tendency of the driver determined by the long-term driving tendency index calculator is calculated as a long-term driving tendency index.

Meanwhile, the controller 20 may determine a condition of a road on which the vehicle currently runs on the basis of the data detected by the data detector 10. The condition of the road includes a specific road state such as an icy road, a slippery road, a rough road, and an unpaved road, a specific road shape such as a curved road and a slope road, and a congested degree. In the case of the specific road state, the specific road shape, or the congested road, it is general that the vehicle is not driven in accordance with the driving tendency of the driver, but runs in accordance with the condition of the road. Therefore, the short-term driving tendency of the driver is not calculated under the specific road condition such that the driving tendency of the driver may be accurately calculated.

In some cases, the short-term driving tendency of the driver may be calculated even under the specific road condition. In such cases, a filter, which is strong against the short-term driving tendency of the driver calculated under the specific road condition, may be applied.

In addition, the controller 20 controls an engine 30 or a transmission 40 in accordance with the long-term driving tendency index of the driver. That is, the controller 20 may change a shift pattern, engagement feeling toward a target shift-speed, an engine torque map, and/or an engine torque filter in accordance with the long-term driving tendency index. Here, the controller 20 determines a running mode, and then may change the shift pattern in accordance with the running mode selected by the driver and the long-term driving tendency.

Figure 2:
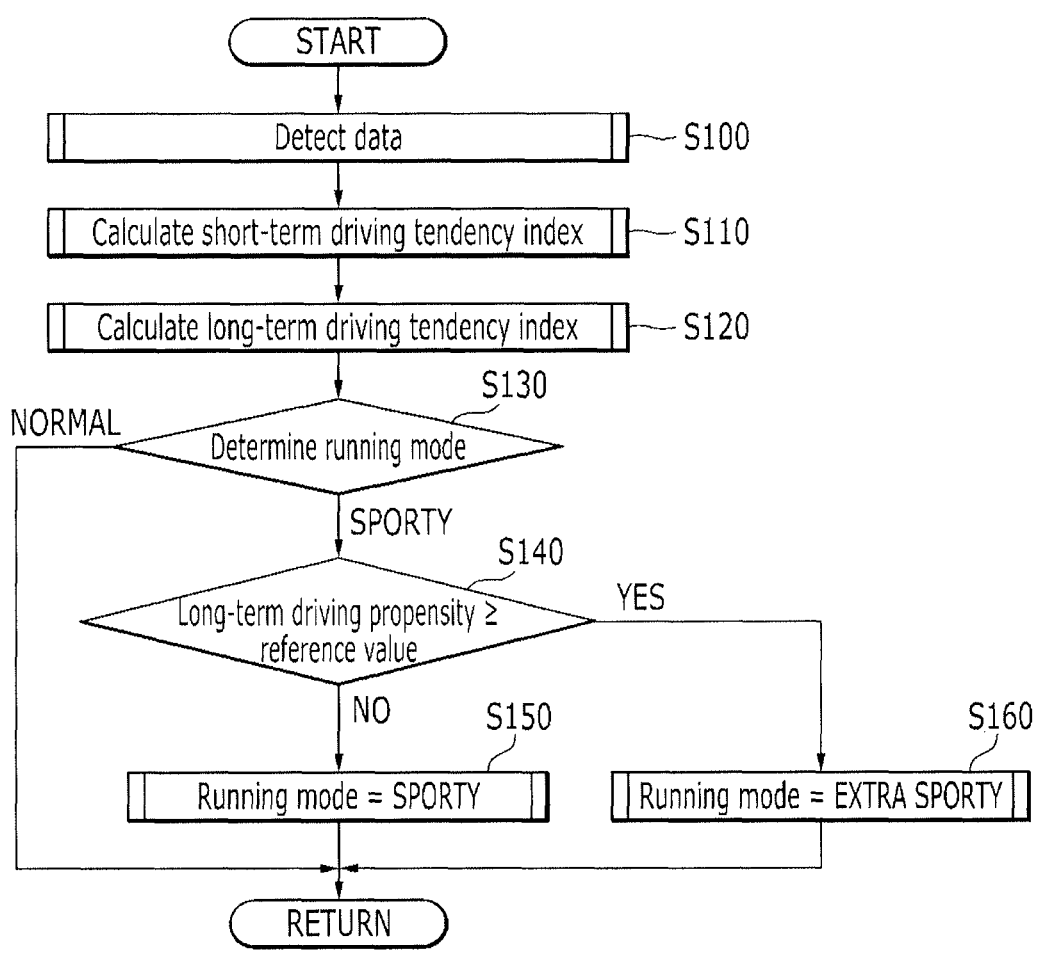
FIG. 2 is a flowchart of an exemplary method for controlling shift in a vehicle according to the present invention.

Hereinafter, a method for controlling shift in a vehicle according to various embodiments of the present invention will be specifically described with reference to FIGS. 2 to 7. FIG. 2 is a flowchart of the method for controlling shift in a vehicle. As illustrated, the data detector 10 detects data for a shift control (S100).

When the data detector 10 detects data and transmits the data to the controller 20, the controller 20 calculates a short-term driving tendency index (SI) for each time (S110). Further, the controller 20 may store an average of the short-term driving tendency indexes for a predetermined time T1 as a short-term driving tendency index (SI_Avg) for a predetermined time. The short-term driving tendency index (SI_Avg) for a predetermined time may be calculated by the following Equation 1.

$$SI\_Avg = \frac{\sum_{t=t_0}^{t_0+T_1(sec)} SI}{T_1(sec)} \quad \text{(Equation 1)}$$

Then, the controller 20 may determine the short-term driving tendency of the driver, which is divided into a plurality of sections, using the short-term driving tendency index.

For example, when assuming that a maximum value of the short-term driving tendency index is 100, and a minimum value thereof is 1, if the short-term driving tendency index is equal to or greater than 1 and less than 41, the controller 20 may determine that the short-term driving tendency of the driver is extra mild. If the short-term driving tendency index is equal to or greater than 41 and less than 61, the controller 20 may determine that the short-term driving tendency of the driver is mild. If the short-term driving tendency index is equal to or greater than 61 and less than 71, the controller 20 may determine that the short-term driving tendency of the driver is normal. If the short-term driving tendency index is equal to or greater than 71 and less than 91, the controller 20 may determine that the short-term driving tendency of the driver is sporty. If the short-term driving tendency index is equal to or greater than 91 and less than 100, the controller 20 may determine that the short-term driving tendency of the driver is extra sporty. One would appreciate that the reference values given herein (e.g., 1, 41, 61, 71, 91 and 100) are exemplary and are readily adjustable.

Next, the controller 20 calculates the long-term driving tendency index from the short-term driving tendency index (S120). For example, the controller 20 may calculate a long-term driving tendency index (SI_long) from recent n short-term driving tendency indexes using the following Equation 2.

$$SI\_long = \frac{\sum_{i=1}^{n} SI\_Avg_{n-i+1} \times W_i}{nT_1} \quad \text{(Equation 2)}$$

Here, SI_Avg$_i$ refers to an i-th short-term driving tendency index, and W$_i$ refers to an i-th weight value. In addition, a sum of n weight values is 1, and the i-th weight value may be equal to or less than an (i+1)-th weight value. By allowing the (i+1)-th weight value to be equal to or greater than the i-th weight value, the recent short-term driving tendency index most greatly influences the long-term driving tendency index.

While the present specification discloses one exemplary method of calculating the short-term driving tendency index and the long-term driving tendency index, it should be understood that the method of calculating the short-term driving tendency index and the long-term driving tendency index is not limited to the exemplary methods disclosed in the present specification.

Next, the controller 20 determines a current running mode of the vehicle (S130). For example, the controller 20 may determine whether the running mode selected by the driver is a normal running mode or a sporty mode. Here, the controller 20 may determine whether the running mode is the normal running mode or the sporty mode by detecting the shift-speed, which is currently engaged, using the shift-speed sensor 13.

Further, in a case in which the running mode is the sporty mode, the controller 20 determines whether the long-term driving tendency of the driver is sporty (i.e. rapid acceleration or rapid braking is performed in a predetermined period of time by a predetermined number of times or more) or extra sporty from the long-term driving tendency index (S140).

Regarding the determination of the long-term driving tendency of the driver, the controller 20 may determine the long-term driving tendency of the driver so that the long-term driving tendency of the driver may be divided into a plurality of sections in accordance with the long-term driving tendency index.

For example, when assuming that a maximum value of the long-term driving tendency index is 100, and a minimum value thereof is 1, if the long-term driving tendency index is equal to or greater than 1 and less than 41, the controller 20 may determine that the long-term driving tendency of the driver is extra mild. If the long-term driving tendency index is equal to or greater than 41 and less than 61, the controller 20 may determine that the long-term driving tendency of the driver is mild. If the long-term driving tendency index is equal to or greater than 61 and less than 71, the controller 20 may determine that the long-term driving tendency of the driver is normal. If the long-term driving tendency index is equal to or greater than 71 and less than 91, the controller 20 may determine that the long-term driving tendency of the driver is sporty. If the long-term driving tendency index is equal to or greater than 91 and less than 100, the controller 20 may determine that the long-term driving tendency of the driver is extra sporty. Likewise, one would appreciate that the reference values given herein (e.g., 1, 41, 61, 71, 91 and 100) are exemplary and are readily adjustable.

Meanwhile, when the running mode is the normal running mode, the controller 20 may control the shift in accordance with each of the long-term driving tendencies. In this regard, a description will be made with reference to FIGS. 3 to 7. FIGS. 3 to 7 are views illustrating exemplary shift patterns with respect to the plurality of long-term driving tendencies according to various embodiments of the present invention. In the graphs illustrated in FIGS. 3 to 7, a Y-axis (aps) indicates how much a driver presses an accelerator pedal, which is measured using the accelerator pedal position sensor 11, and an X-axis indicates a vehicle speed.

Figure 3:
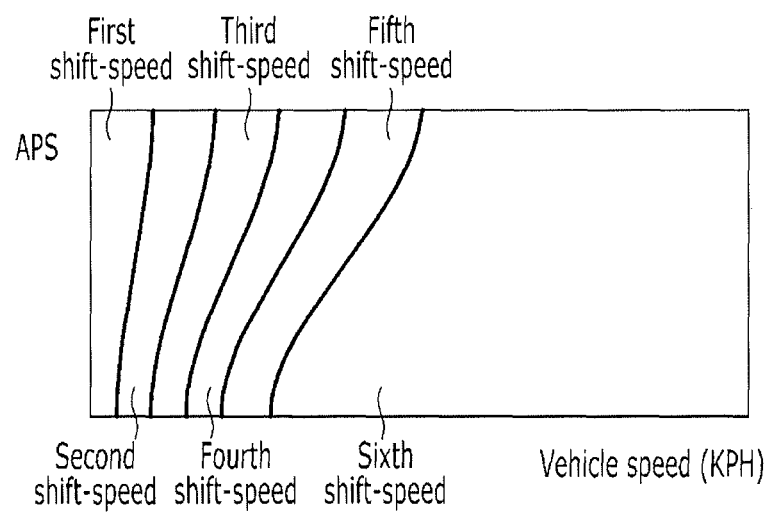
FIGS. 3 to 7 are views illustrating exemplary shift patterns with respect to a plurality of long-term driving tendencies according to the present invention.
Figure 4:
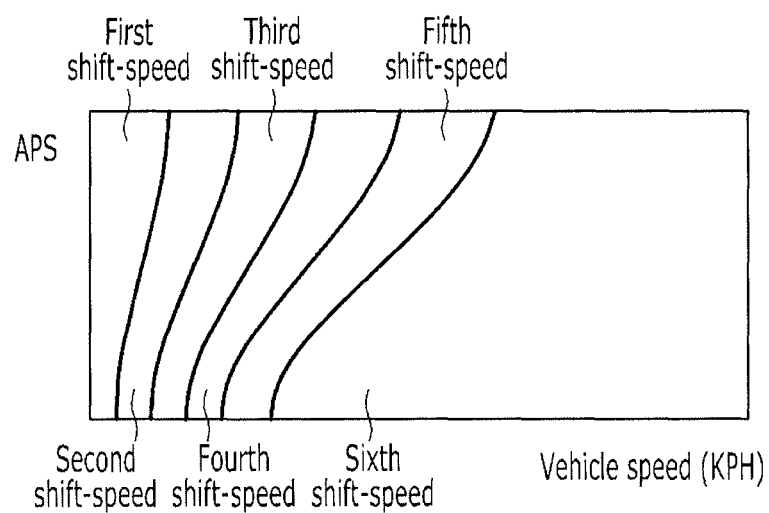
Figure 5:
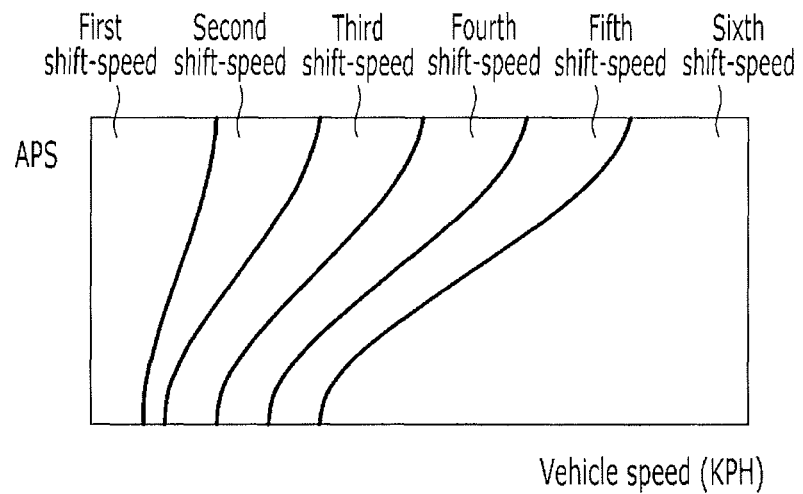
Figure 6:
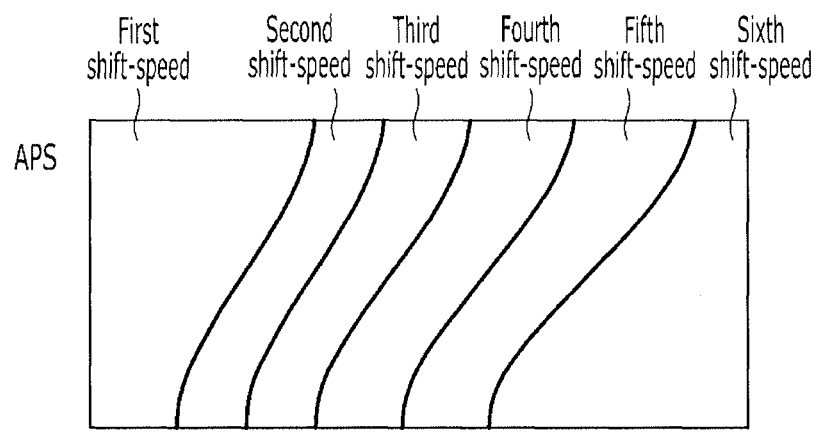
Figure 7:
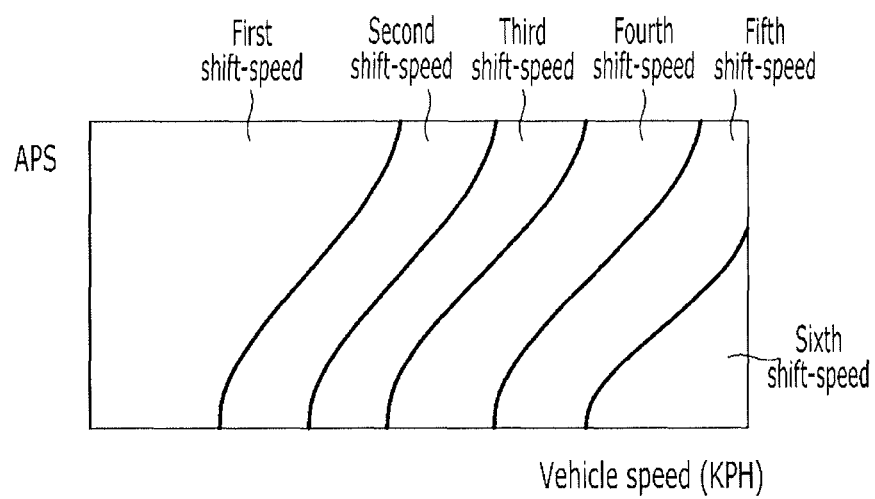

FIG. 3 is a view exemplarily illustrating a shift pattern when the long-term driving tendency of the driver is extra mild. FIG. 4 is a view exemplarily illustrating a shift pattern when the long-term driving tendency of the driver is mild. FIG. 5 is a view exemplarily illustrating a shift pattern when the long-term driving tendency of the driver is normal. FIG. 6 is a view exemplarily illustrating a shift pattern when the long-term driving tendency of the driver is sporty. FIG. 7 is a view exemplarily illustrating a shift pattern when the long-term driving tendency of the driver is extra sporty.

As illustrated in FIGS. 3 to 7, when the running mode is the normal running mode, in the extra mild tendency, the shift may be performed in a state in which the vehicle speed is relatively low, and in the extra sporty tendency, the shift may be performed in a state in which the vehicle speed is relatively high.

In step S140, when it is determined that the long-term driving tendency index is less than a predetermined value, the controller 20 determines that the tendency of the driver is not sporty or extra sporty, and controls the shift in accordance with the sporty mode that is the running mode selected by the driver (S150).

Even in the case of all the long-term driving tendencies when it is determined that the long-term driving tendency index is less than a predetermined value, the controller 20 changes a shift pattern and the engagement feeling toward a target shift-speed so that the vehicle runs in the sporty mode that is the selected running mode, and may control the transmission 40 in accordance with the changed shift pattern and the changed engagement feeling toward the target shift-speed.

In addition, even in the case of all the long-term driving tendencies when it is determined than the long-term driving tendency index is less than a predetermined value, the controller 20 may facilitate kick down-shift so that the vehicle runs in the sporty mode that is the selected running mode, and change an engine torque map and an engine torque filter so as to allow shift feeling to be sporty and allow acceleration to be performed well.

For example, even though the long-term driving tendency of the driver is extra mild, if the sporty mode is selected as the running mode, the controller 20 may control the transmission 40 in the shift pattern illustrated in FIG. 6. In addition, even though the long-term driving tendency of the driver is mild or normal, if the sporty mode is selected as the running mode, the controller 20 may control the transmission 40 in the shift pattern illustrated in FIG. 6.

Next, in step S140, when it is determined that the long-term driving tendency index is a predetermined value or more, the controller 20 determines that the tendency of the driver is sporty or extra sporty, and controls the shift in accordance with the extra sporty mode (S160).

In a case in which the long-term driving tendency index is a predetermined value or more, the controller 20 changes the shift pattern and the engagement feeling toward the target shift-speed in accordance with the extra sporty tendency illustrated in FIG. 7, and may control the transmission 40 in accordance with the changed shift pattern and the engagement feeling toward the target shift-speed.

In addition, the controller 20 may change the engine torque map and the engine torque filter so as to facilitate the kick down-shift, make the shift feeling sporty, and allow acceleration to be performed well, in comparison with the sporty mode. For example, in a case in which the long-term driving tendency of the driver is sporty, if the sporty mode is selected as the running mode, the controller 20 may control the transmission 40 in the shift pattern illustrated in FIG. 7. In addition, even though the long-term driving tendency of the driver is extra sporty, if the sporty mode is selected as the running mode, the controller 20 may control the transmission 40 in the shift pattern illustrated in FIG. 7.

As described above, according to various embodiments of the present invention, the shift is controlled in consideration of the running mode and the long-term driving tendency of the driver, thereby more accurately reflecting the driver's intention when the shift is performed.

As described above, the device and the method for controlling shift in a vehicle according to various embodiments of the present invention control the transmission 40 in the shift pattern having the sporty tendency in which a predetermined offset is applied to the long-term driving tendency, thereby providing a sporty mode shift pattern that coincides with the long-term driving tendency. Therefore, by the device and the method for controlling shift in a vehicle, the shift may be controlled so that the shift pattern in the sporty mode is at least not milder than the shift pattern in the normal running mode.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A device for controlling shift in a vehicle comprising:
   a data detector configured to detect data for shift control; and
   a controller configured to determine a short-term driving tendency of a driver using the data, determine a long-term driving tendency of the driver using the short-term driving tendency of the driver, and control shift in the vehicle in consideration of a running mode of the vehicle and the long-term driving tendency which are determined from the data,
   wherein the controller determines whether the running mode is a first mode,
   wherein when it is determined that the running mode is the first mode, the controller determines whether a long-term driving tendency index of the driver is equal to or greater than a predetermined reference value,
   wherein when it is determined that the long-term driving tendency index of the driver is equal to or greater than the predetermined reference value, the controller changes the running mode to a second mode, and
   wherein when it is determined that the long-term driving tendency index of the driver is less than the predetermined reference value, the controller maintains the running mode as the first mode.

2. The device of claim 1, wherein the controller calculates a short-term driving tendency index using the data, and determines the short-term driving tendency that is divided in a plurality of sections in accordance with a value of the short-term driving tendency index.

3. The device of claim 2, wherein the controller calculates the long-term driving tendency index using the short-term driving tendency, and determines the long-term driving tendency that is divided in a plurality of sections in accordance with a value of the long-term driving tendency index.

4. The device of claim 1, wherein the data includes at least one of a speed of the vehicle, acceleration of the vehicle, a shift-speed, a steering angle of the vehicle, and a distance between the driver's vehicle and a forward vehicle.

5. A method for controlling shift in a vehicle comprising:
  detecting data for shift control;
  determining a short-term driving tendency of a driver using the data;
  determining a long-term driving tendency of the driver using the short-term driving tendency of the driver;
  determining a running mode of the vehicle from the data; and
  controlling shift in the vehicle in consideration of the long-term driving tendency and the running mode of the vehicle,
  wherein the controlling of the shift in the vehicle includes determining whether the running mode is a first mode;
  wherein the controlling of the shift in the vehicle further includes determining whether a long-term driving tendency index of the driver is equal to or greater than a predetermined reference value when it is determined that the running mode is the first mode,
  wherein the controlling of the shift in the vehicle further includes changing the running mode to a second mode when it is determined that the long-term driving tendency index of the driver is equal to or greater than the predetermined reference value, and
  wherein the controlling of the shift in the vehicle further includes maintaining the running mode as the first mode when it is determined that the long-term driving tendency index of the driver is less than the predetermined reference value.

6. The method of claim 5, wherein the determining of the short-term driving tendency of the driver includes:
  calculating a short-term driving tendency index using the data; and
  determining the short-term driving tendency that is divided in a plurality of sections in accordance with a value of the short-term driving tendency index.

7. The method of claim 6, wherein:
  the determining of the long-term driving tendency of the driver includes calculating the long-term driving tendency index using the short-term driving tendency, and determining the long-term driving tendency that is divided in plural numbers in accordance with a value of the long-term driving tendency index.

8. The method of claim 5, wherein the data includes at least one of a speed of the vehicle, acceleration of the vehicle, a shift-speed, a steering angle of the vehicle, and a distance between the driver's vehicle and a forward vehicle.

* * * * *